(12) United States Patent
Matsuda et al.

(10) Patent No.: US 8,944,439 B2
(45) Date of Patent: Feb. 3, 2015

(54) SUSPENSION FOR VEHICLE

(75) Inventors: Yasuyuki Matsuda, Kanagawa (JP); Daisuke Gunji, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/117,703

(22) PCT Filed: Feb. 28, 2012

(86) PCT No.: PCT/JP2012/054976
§ 371 (c)(1),
(2), (4) Date: Dec. 12, 2013

(87) PCT Pub. No.: WO2013/051298
PCT Pub. Date: Apr. 11, 2013

(65) Prior Publication Data
US 2014/0091538 A1 Apr. 3, 2014

(30) Foreign Application Priority Data
May 16, 2011 (JP) .................... 2011-109757

(51) Int. Cl.
*B60G 7/00* (2006.01)
*B60G 17/016* (2006.01)
(52) U.S. Cl.
CPC ............ *B60G 7/006* (2013.01); *B60G 17/0162* (2013.01); *B60G 2200/46* (2013.01); *B60G 2202/40* (2013.01); *B60G 2202/442* (2013.01); *B60G 2204/143* (2013.01)
USPC .................... 280/5.521; 280/5.52; 280/86.751
(58) Field of Classification Search
CPC ..................... B60G 2200/46; B60G 21/007
USPC ............... 280/5.52, 5.521, 86.75, 86.751
See application file for complete search history.

(56) References Cited

U.S. PATENT DOCUMENTS 5,472,225 A * 12/1995 Harara et al. ............... 280/86.75
5,700,025 A * 12/1997 Lee .......................... 280/86.751
(Continued)

FOREIGN PATENT DOCUMENTS

JP       10-264636 A      10/1998
JP       2005-098771 A    4/2005
(Continued)

OTHER PUBLICATIONS

International Search Report and Written Opinion dated May 22, 2012 from the corresponding PCT/JP2012/054976.
(Continued)

*Primary Examiner* — James English
(74) *Attorney, Agent, or Firm* — Katten Muchin Rosenman LLP

(57) ABSTRACT

A upper arm 4*b* of a suspension for a vehicle is constructed by: a casing 12 that is supported by the vehicle so as to be able to pivot in the up-down direction; a pair of screw shafts 20 that are supported by the casing 12 so as to be able to move only in the axial direction; a pair of screw nuts 21 that engage around the pair of screw shafts 20, and are supported by the casing so as only to be able to rotate; a worm reduction gear 14 that rotates the screw nuts 21; and a pair of link arms 29, where the base end sections respectively connect to the tip end sections of the pair of screw shafts 20 and the tip end sections respectively connect to knuckle 3 so as to be able to rotate around a shaft in the up-down direction of the vehicle. The screw shafts 20 are moved out in opposite directions from each other in the axial direction, which causes the opening angle of the pair of link arms 29*a* to change, and thus changes the overall length of the upper arm 4*b* in the width direction of the vehicle.

7 Claims, 7 Drawing Sheets

(56) References Cited

U.S. PATENT DOCUMENTS

| | | | |
|---|---|---|---|
| 6,116,626 A * | 9/2000 | Cherry et al. | 280/124.135 |
| 7,922,181 B2 * | 4/2011 | Hakui et al. | 280/6.157 |
| 8,200,407 B2 * | 6/2012 | Horiguchi et al. | 701/80 |
| 8,474,844 B2 * | 7/2013 | Kwon et al. | 280/124.135 |
| 2005/0017471 A1 * | 1/2005 | Kim | 280/86.751 |
| 2007/0210539 A1 | 9/2007 | Hakui et al. | |

FOREIGN PATENT DOCUMENTS

| | | |
|---|---|---|
| JP | 2006-043229 A | 2/2006 |
| JP | 2007-203934 A | 8/2007 |
| JP | 2007-253863 A | 10/2007 |
| JP | 2008-067555 A | 3/2008 |
| JP | 2008-105599 A | 5/2008 |
| JP | 2008-184147 A | 8/2008 |
| JP | 2009-107533 A | 5/2009 |
| JP | 2010-083212 A | 4/2010 |

OTHER PUBLICATIONS

"Illustrated Book of Car Mechanisms and Structures", Hosokawa, Takeshi; Grand Prix Book Publishing Co., Ltd.; Jan. 10, 2003; p. 207.

* cited by examiner

SUSPENSION FOR VEHICLE

TECHNICAL FIELD

The present invention relates to a double wishbone suspension for a vehicle that can suitably change the camber angle according to the traveling condition of the vehicle.

BACKGROUND ART

Various kinds of construction for a suspension for a vehicle such as an automobile are known. Recently, a double wishbone suspension, which has a high degree of design freedom and has excellent road surface followability, is used in many kinds of automobiles such as luxury automobiles and sports cars. FIG. 4 illustrates a first example of conventional construction of a double wishbone suspension that is disclosed in "Illustrated Book of Car Mechanisms and Structures" (Hosokawa, Takeshi; Grand Prix Book Publishing Co., Ltd.; Jan. 10, 2003; pg. 207).

A knuckle 3, which supports a wheel 1 by way of a bearing unit 2 so as to be able to rotate, is supported by the vehicle (not illustrated in the figure) by an upper arm 4 and a lower arm 5 of a double wishbone suspension so as to be able to pivot. The upper arm 4 is made using a so-called A-frame having an A shape, with the tip end section (when installed in the vehicle, the end section on the outside in the width direction of the vehicle, or the end section on the right side in FIG. 4) thereof being connected to the top end section of the knuckle 3 by way of an upper ball joint 6. Moreover, the base end section of the upper arm 4 (when installed in the vehicle, the end section on the center side in the width direction of the vehicle, or the end section on the left side in FIG. 4) is supported by the vehicle (not illustrated in the figure) by a pivot shaft so as to be able to pivot.

On the other hand, the lower arm 5 is also made using so-called A-frame having an A shape, with the tip end section thereof being connected to the bottom end section of the knuckle 3 by way of a lower ball joint 7. Moreover, the base end section of the lower arm 5 is supported by the vehicle (not illustrated in the figure) by a pivot shaft so as to be able to pivot. Furthermore, the lower arm 5 supports the bottom end section of a shock absorber 8, the top end of which is fastened to the vehicle, by a pivot shaft so as to be able to pivot.

In the case of the double wishbone suspension having this kind of conventional construction, by using an upper arm 4 and lower arm 5 having different overall lengths (typically the lower arm is longer than the upper arm), the camber angle is preset to a specified angle. However, in the case of a suspension having conventional construction, the camber angle that is preset in this way cannot be changed according to the traveling conditions of the vehicle.

Incidentally, the turning movement of a vehicle occurs due to the difference in drive force on the left and right wheels and the like, however mainly occurs due to lateral force on the tires. This lateral force on the tires is generated by the driver operating the steering wheel and causing the toe angle (steering angle) of the front wheels to change by way of a steering gear, and causing a shift (slip angle) to occur between the traveling direction of the vehicle and the direction of the tires. This lateral force on the tires, in addition to the toe angle, is known to be affected by the change in the camber angle. FIG. 5 illustrates the relationship between the lateral force on the tires and the slip angle when the camber angle, which was found by the inventors through simulation, was used as a parameter. As can be clearly seen in FIG. 5, even when the slip angle is constant, it is possible to cause the lateral force on the tires to change by causing the camber angle to change. Therefore, by being able to adjust the size of the lateral force on the tires by changing the camber angle, it is possible to improve the turning performance of the vehicle, as well as further improve the performance when going straight.

JP 10-264636 (A) discloses a double wishbone suspension for a vehicle that is capable of changing the camber angle according to the traveling condition of the vehicle. FIG. 6 illustrates a second example of conventional construction as disclosed in this patent literature. In the case of this second example of conventional construction, hydraulic cylinders 9 and 10, which are capable of expanding and contracting, are provided in the middle section of the upper arm 4a and lower arm 5a and make it possible for the entire length of upper arm 4a and the lower arm 5a to change. A sensor (not illustrated in the figure) detects the angle of sideslip of the wheel 1, and when it is recognized that the camber angle must be changed, a specified amount of hydraulic oil is supplied to the hydraulic cylinders 9 and 10 from a hydraulic pump that is located in the engine room by way of hydraulic piping and various valves. As a result, the entire lengths of the upper arm 4a and the lower arm 5a are changed and the camber angle of the wheel 1 is changed. With the suspension of this second example of convention construction, it is possible to adjust the size of the lateral force on the tires, and improve the turning performance of the vehicle, as well as the performance for traveling straight.

However, in the case of this second example of conventional construction, in order to make it possible to change the camber angle, it is necessary to provide a hydraulic pump, hydraulic piping and various valves, and it is also necessary to provide hydraulic cylinders 9, 10 in the upper arm 4a and lower arm 5a. Therefore, not only is there a problem in that the construction for making it possible to change the camber angle is complex, but there is also a problem in that the size and weight of the suspension are increased. Particularly, the increase in the weight of the upper arm 4a and the lower arm 5a is connected to an increase in the unsprung weight, which is undesirable from the aspect of improve traveling performance of the vehicle centered on comfort and traveling stability. Moreover, control of the camber angle is performed hydraulically, so there is a problem in that the controllability and response is bad, and furthermore there is a problem in that power loss of the engine becomes large.

JP 2009-107533 (A) and JP 2010-83212 (A) disclose camber angle adjustment apparatuses for changing the size of the camber angle according to the traveling conditions of the vehicle. However, even in the case of the apparatuses disclosed in these patent literatures, as in the case of the apparatus disclosed in JP 10-263636 (A), there is a problem in that the construction for making it possible to change the camber angle is complex, and invites an increase in size and weight of the suspension. As related technology to the present invention, there is a load measurement apparatus for measure a load applied to a bearing unit that is disclosed in JP 2005-98771 (A).

RELATED LITERATURE

Patent Literature

[Patent Literature 1] JP 10-264636 (A)
[Patent Literature 2] JP 2009-107533 (A)

[Patent Literature 3] JP 2010-83212 (A)
[Patent Literature 4] JP 2005-98771 (A)

NON-PATENT LITERATURE

Non-Patent Literature 1

"Illustrated Book of Car Mechanisms and Structures", Hosokawa, Takeshi; Grand Prix Book Publishing Co., Ltd.; Jan. 10, 2003; pg. 207

SUMMARY OF THE INVENTION

Problem to be Solved by the Invention

In consideration of the situation described above, the object of the present invention is to achieve simple construction of suspension for a vehicle that is capable of suitably changing the camber angle according to the traveling condition of the vehicle without inviting complexity of the apparatus and also the increase in size and weight that accompanies such a complex apparatus.

Means for Solving the Problems

The suspension for a vehicle of the present invention, basically is the same as a double wishbone suspension for a vehicle having conventional construction, and comprises: an upper arm that has a tip end section that is connected by way of an upper joint to the upper portion of a knuckle by which a wheel is supported so as to be able to rotate, and a base end section that is supported by the vehicle so as to be able to pivot in the up-down direction; and a lower arm that has a tip end section that is connected by way of a lower joint to the lower portion of the knuckle, and a base end section that is supported by the vehicle so as to be able to pivot in the up-down direction.

The suspension for a vehicle of the present invention is characterized by the construction of the upper arm. In other words, the upper arm of the suspension for a vehicle of the present invention comprises:

a casing that is supported by the vehicle so as to be able to pivot in the up-down direction;

a pair of screw shafts that are located on the same axis in the forward-backward direction of the vehicle, and are supported by the casing so as to be able to move only in the axial direction;

a pair of screw nuts that engage around the pair of screw shafts, and are supported by the casing so as only to be able to rotate;

a worm wheel that is combined with the pair of screw nuts so as to be able to rotate in synchronization with the screw nuts;

a worm that comprises worm teeth that engage with the worm wheel;

an electric motor that is supported by the casing, and is able to rotate and drive the worm in both directions; and a pair of link arms that have a tip end section and a base end section, where the base end sections respectively connect to the tip end sections of the pair of screw shafts so as to be able to rotate around a shaft in the up-down direction of the vehicle, and the tip end sections respectively connect to the upper joints so as to be able to rotate around a shaft in the up-down direction of the vehicle.

Moreover, the suspension for an automobile of the present invention is characterized in that by the electric motor rotating and driving the worm so as to cause the pair of screw shafts to move out in opposite directions from each other in the axial direction, the opening angle of the pair of link arms changes, and thus the length of the pair of link arms in the width direction of the vehicle changes, or in other words, the overall length of the upper arm in the width direction of the vehicle changes.

By respectively combining the pair of screw shafts and the pair of screw nuts, a feed screw mechanism is formed. A sliding screw type feed screw mechanism can be applied as this feed screw mechanism, wherein the pair of screw shafts and the pair of screw nuts are respectively combined, and a female screw thread that is formed around the inner circumferential surface of each of the screw nuts engage with a male screw thread that is formed around the outer circumferential surface of each of the screw shafts such that they can slide against one another.

Alternatively, a ball screw type feed screw mechanism can be applied as this feed screw mechanism, wherein the pair of screw shafts and the pair of screw nuts are respectively combined, and an outer-diameter side ball screw groove that is formed around the inner circumferential surface of each of the screw nuts engage with an inner-diameter side ball screw groove that is formed around the outer circumferential surface of each of the screw shafts by way of a plurality of balls that are placed between them.

Moreover, preferably, a rotation stopping mechanism for preventing relative rotation of the screw shafts with respect to the casing while allowing axial displacement of the screw shafts is provided between the pair of screw shafts and the casing.

Preferably, the worm wheel is made of synthetic resin. Furthermore, preferably, a speed reducer that increases the power of the electric motor and transmits that power to the worm is provided between the worm and the electric motor.

Effect of the Invention

With the present invention constructed as described above, it is possible to achieve a suspension for a vehicle with simple construction that is capable of suitably changing the camber angle according to the traveling conditions of the vehicle, and it is possible to make the overall suspension more compact and lightweight. In other words, in the case of the suspension for a vehicle of the present invention, construction for making it possible to change the overall length of the upper arm (length of the link arms in the width direction of the vehicle) is consolidated in the upper arm itself. Therefore, the other members, such as the lower arm, can be the same as used in the conventional construction. Moreover, there is no need to install members such as a hydraulic pump on the vehicle side (for example, the engine room) as was required in the second example of conventional construction. Furthermore, the upper arm is such that by using simple construction of just combining a pair of feed screw mechanisms, a worm reduction gear and a link mechanism, it becomes possible to change the overall length of the upper arm.

Therefore, with the suspension for a vehicle of the present invention, not only is it possible to improve the turning performance and the performance with traveling straight of the vehicle, but it is also possible to sufficiently suppress an increase in the unsprung weight, and to improve the traveling performance of the vehicle centered on traveling comfort and traveling stability. Furthermore, control of the camber angle (control of the overall length of the upper arm) is performed controlling the supply of electricity to an electric motor, so when compared to being controlled hydraulically, there is excellent controllability and response, and there is little power loss of the engine. In addition, electric power (energy) is consumed only when the motor is being driven, so it is also possible to save energy. It is also possible to independently control the camber angle of the left and right wheels.

BRIEF DESCRIPTION OF THE DRAWINGS

FIG. 2A illustrates the maximum overall length, and FIG. 2B illustrates the minimum overall length.

MODES FOR CARRYING OUT THE INVENTION

Example 1

Figure 1:
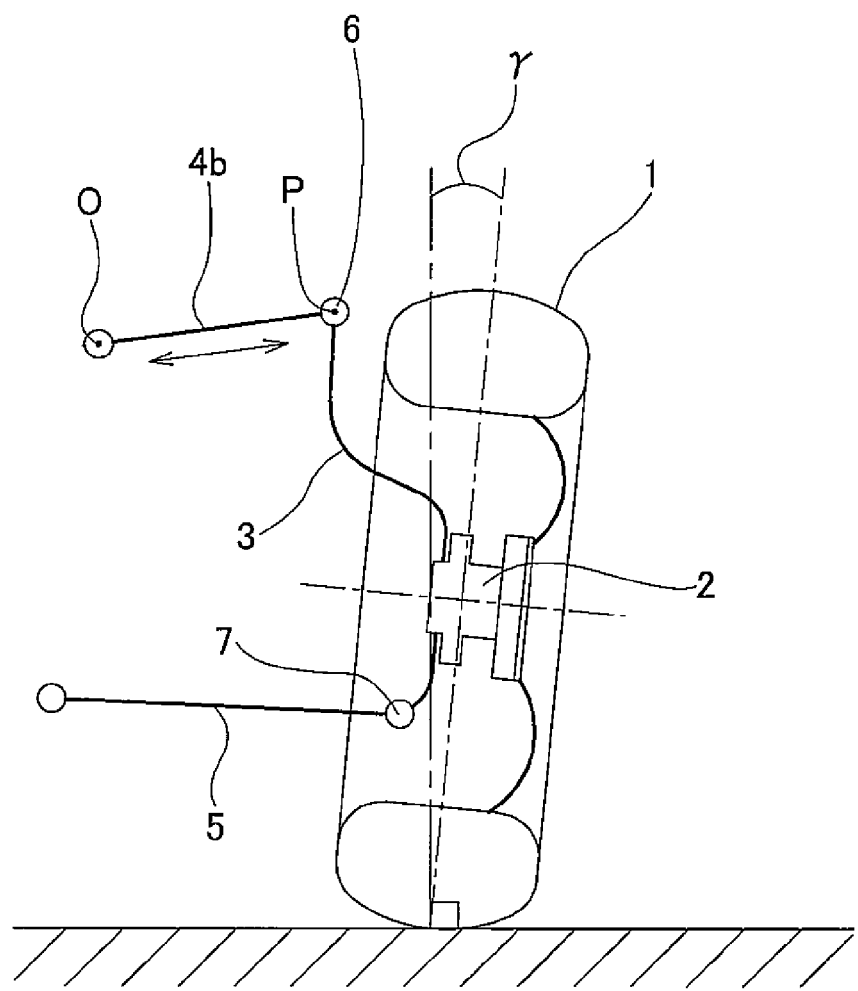
FIG. 1 is a front view that schematically illustrates the suspended state of a wheel by a vehicle in the case of a first example of suspension for a vehicle of an embodiment of the present invention.
Figure 2A:
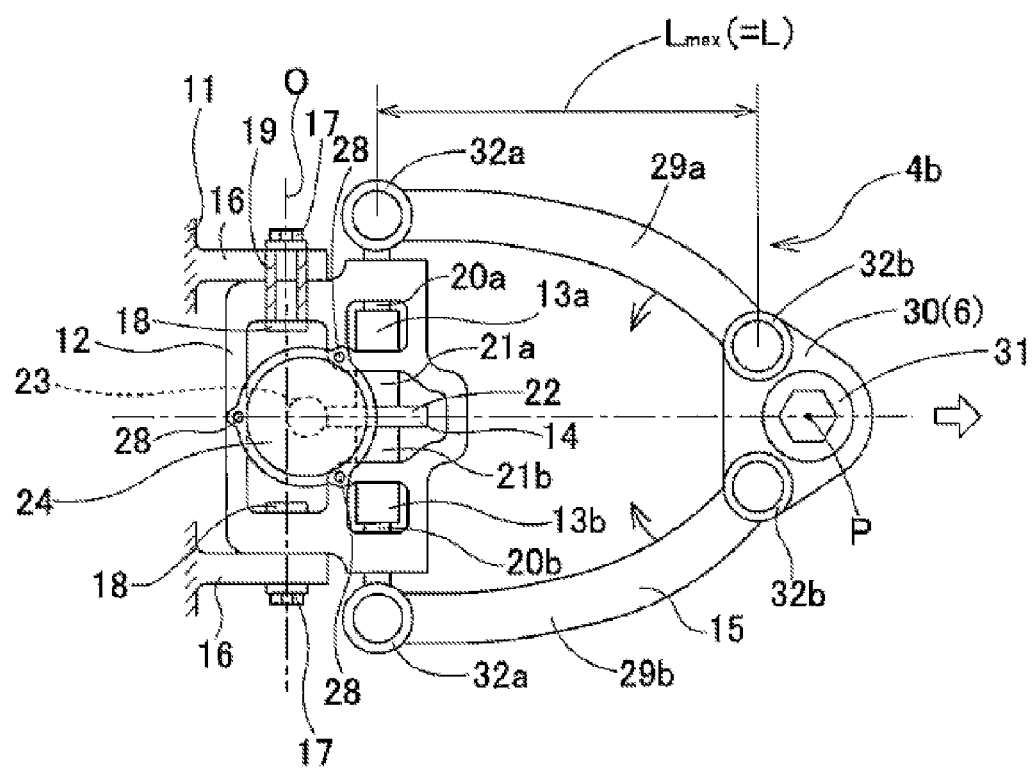
FIGS. 2A and 2B are top views of an upper arm that has been removed from the suspension for a vehicle that is illustrated in FIG. 1 as seen from above the vehicle, where
Figure 2B:
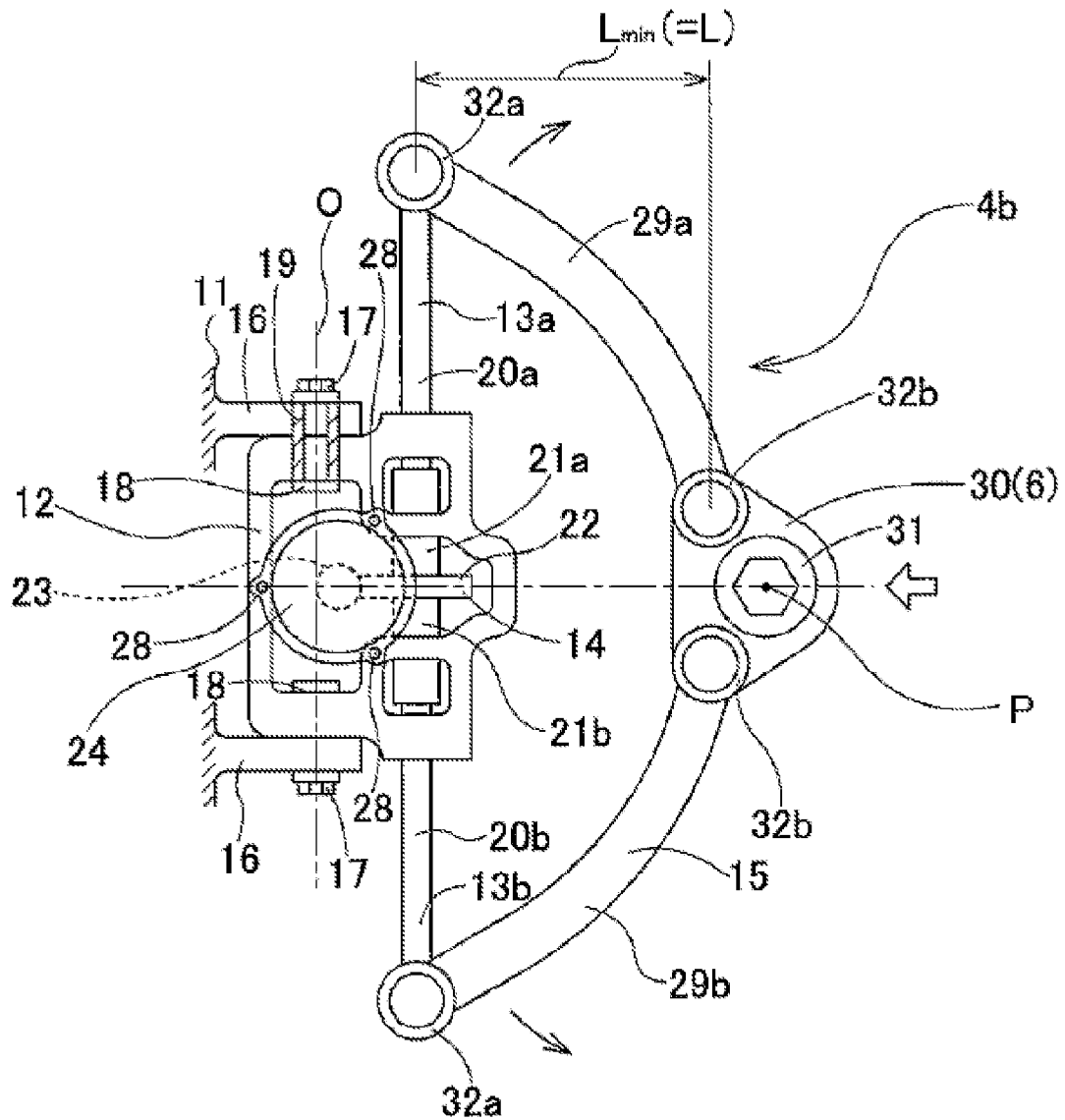
Figure 3:
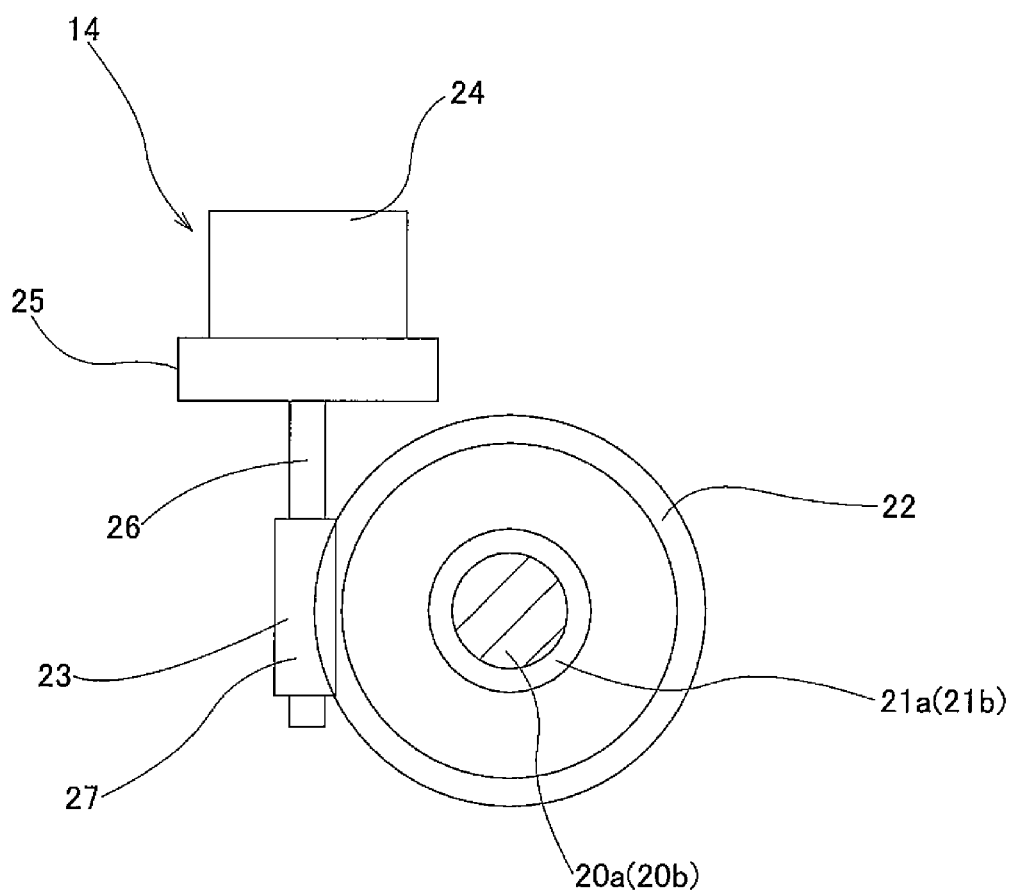
FIG. 3 is a drawing illustrated a worm reduction gear that has been removed from the suspension for a vehicle that is illustrated in FIG. 1.
Figure 4:
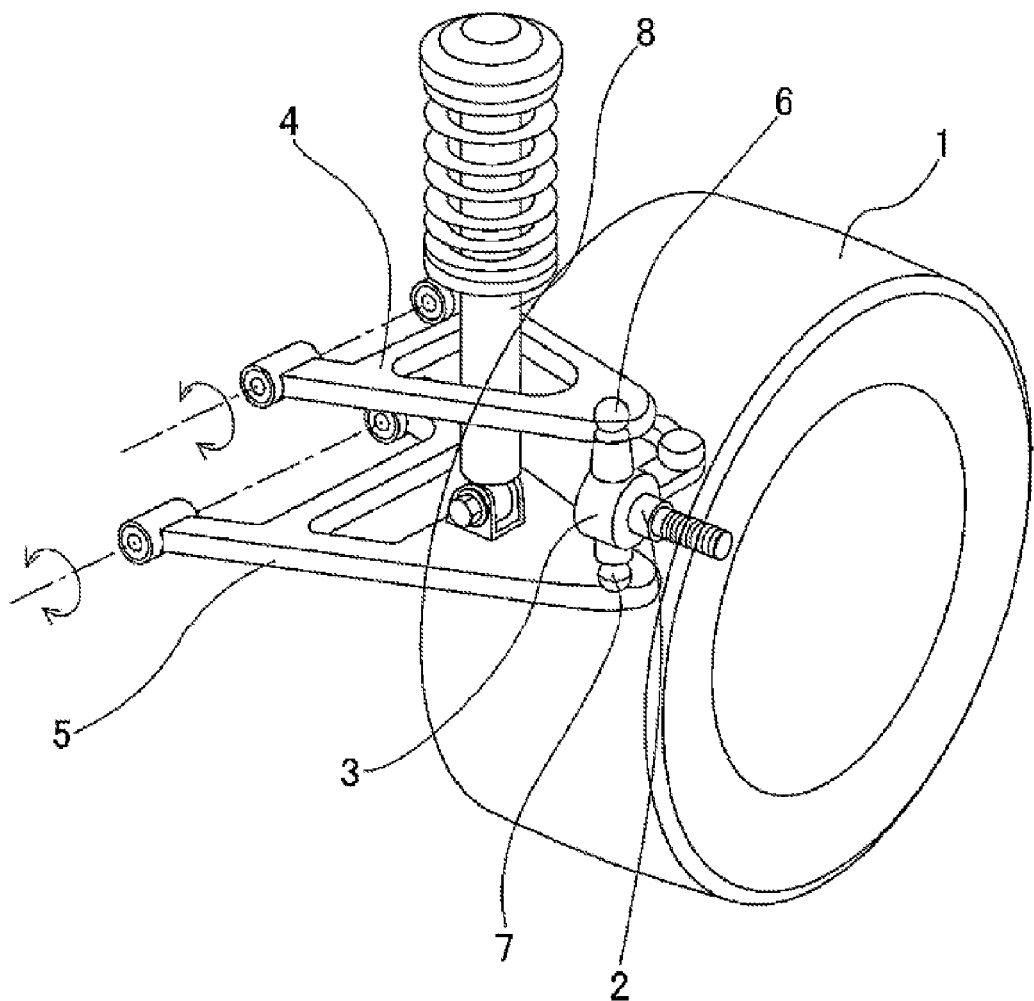
FIG. 4 is a perspective view that schematically illustrates a first example of conventional construction of a suspension for a vehicle.
Figure 5:
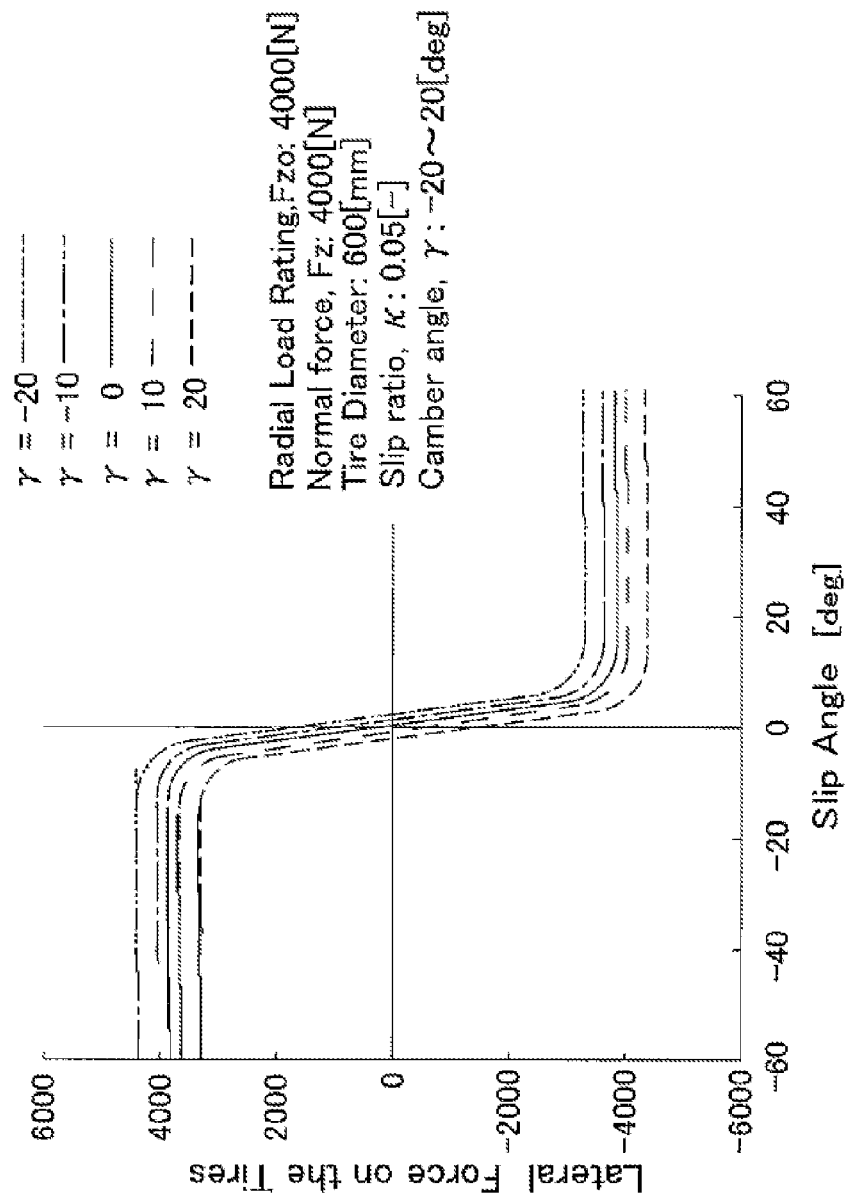
FIG. 5 is a graph that illustrates the relationship between the lateral force on the tires and the slip angle when the camber angle, which was found through simulation, was used as a parameter.
Figure 6:
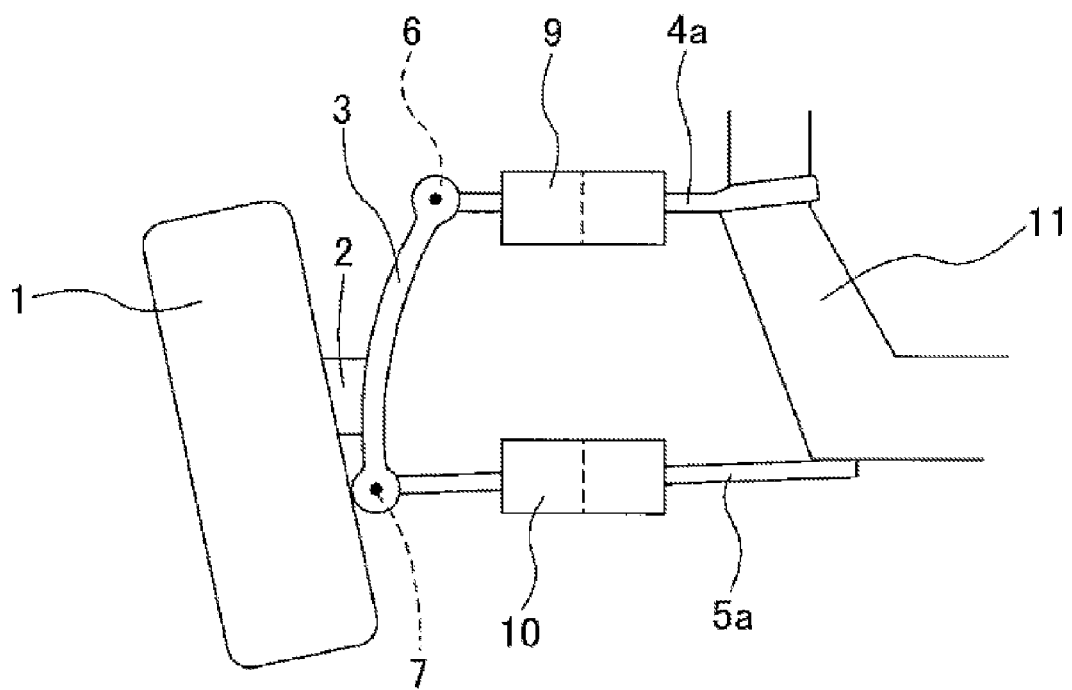
FIG. 6 is a front view that schematically illustrates a second example of conventional construction of a suspension for a vehicle.

FIG. 1 to FIG. 3 illustrate an example of an embodiment of the present invention. A feature of this example is making it possible to suitably change the camber angle γ according to the traveling conditions of a vehicle by consolidating construction for making it possible to change the overall length of the upper arm 4b in the upper arm 4b itself of a double wishbone suspension of a vehicle. The lower arm 5 and other members are the same as in the first example of conventional construction illustrated in FIG. 4. Therefore, the explanation below will center on the construction of the upper arm 4b, which is the feature of this example.

As illustrated in FIG. 1, even in the case of the suspension for a vehicle of this example, the knuckle 3, which supports the wheel 1 by way of a bearing unit 2 so as to be able to rotate, is supported by the vehicle 11 (see FIG. 2) by way of the upper arm 4b and lower arm 5 so as to be able to pivot. In order for this, the tip end section (right end section in FIG. 1 and FIG. 2) of the upper arm 4b is connected to the top end section of the knuckle 3 by way of an upper ball joint 6, which is an upper joint, and the base end section (left end section in FIG. 1 and FIG. 2) of the upper arm 4b is supported by the vehicle 11 so as to be able to pivot. Moreover, the tip end section of the lower arm 5 is connected to the bottom end section of the knuckle 3 by way of a lower ball joint 7, which is a lower joint, and the base end section of the lower arm 5 is supported by the vehicle 11 so as to be able to pivot. Here, normally ball joints are used for these joints, however as long as pivotal displacement in each direction of the tip end sections of the upper arm 4b and lower arm 5 is allowed, it is possible to use other construction, including a Cardan joint.

Particularly in the case of this example, in order to make it possible to change the overall length of the upper arm 4b, this upper arm 4b is constructed by a casing 12, a pair of feed screw mechanism 13a, 13b, a worm reduction gear 14, and a link mechanism 15. The casing 12 is supported by a pair of installation sections 16 that are provided on the vehicle 11 and separated in the forward-backward direction using bolts 17 and nuts 18 and by way of a rubber bushing so as to be able to pivot in the up-down direction of the vehicle 11, with the base end half (inner half in the width direction, left half section in FIG. 2) located in a portion between the installation sections 16. In this example, the center axis of both bolts 17 coincides with the center of pivoting of the upper arm 4b. Moreover, the feed screw mechanisms 13a, 13b are located in the forward-backward direction of the vehicle 11 on the inside of the tip end half of the casing 12 (outer half in the width direction, right half in FIG. 2), and the worm reduction gear 14 is provided in the center section in the forward-backward direction of the base end half of the casing 12.

Each feed screw mechanism 13a (13b) is a sliding screw type feed screw mechanism that is constructed by a combination of a screw shaft 20a (20b) and a screw nut 21a (21b). The screw shafts 20a, 20b are made of stainless steel for example, and are located on the same axis in the forward-backward direction of the vehicle 11. Helical shaped male screw threads are formed on the outer circumferential surface of the screw shafts 20a, 20b, and the pitch is the same between these screw shafts 20a, 20b. Furthermore, a rotation stopping convex section (not illustrated in the figures) is formed on at least part of the outer circumferential surface of each screw shaft 20a, 20b, and this rotation stopping convex section engages with a rotation stopping concave groove (not illustrated in the figures) that is formed on the casing 12. The screw shafts 20a, 20b are supported by the casing 12 wherein, with this rotation stopping mechanism, displacement in the axial direction with respect to the casing 12 is allowed, however, relative rotation is prevented. In this example, by using sliding screw type screw feed mechanisms, it is possible to reduce the number of parts and make the suspension more lightweight. However, alternatively, by using ball screw type feed screw mechanisms, it is possible to reduce the torque required for rotating and driving the screw shafts 20a, 20b, and by doing so making the suspension more compact and lightweight by using a smaller electric motor. Furthermore, in this case, it is possible to improve the precision of positioning the screw shafts 20a, 20b, and thus it is also possible to control the camber angle more accurately.

Both of the screw nuts 21a, 21b are made of a synthetic resin such as polyphenylene sulfide, polyamide-66, polyether ether ketone (PEEK), polyacetal or the like, and helical female screw threads are formed on the inner circumferential surfaces thereof. In this example, these screw nuts 21a, 21b are formed at the same time by injection molding such that the base end sections are integrated with each other. The female screw threads that are formed on the inner circumferential surfaces of these screw nuts 21a, 21b such that they are in the opposite direction from each other. The screw nuts 21a, 21b having this kind of construction are supported on the inside of the casing 12 so as to only be able to rotate, and the female threads that are formed on the inner circumferential surfaces thereof engage with the male threads that are formed in opposite directions from each other on the outer circumferential surface of the screw shafts 20a, 20b such that sliding movement is possible.

The worm reduction gear 14, as illustrated in FIG. 3, is constructed by a worm wheel 22, a worm 23, an electric motor 24 and a speed reducer 25. The worm wheel 22 is made of a synthetic resin such as polyphenylene sulfide, polyamide-66, MC nylon (registered trademark), which is a kind of polyamide resin, polyether ether ketone (PEEK), polyacetal or the like, and is placed so as to be concentric with the screw nuts 21a, 21b. Glass fibers or carbon fibers are added to the synthetic resin, making it possible to improve the strength and rigidity of the worm wheel 22. In this example, by processing and forming the worm wheel 22 at the same time as the screw nuts 21a, 21b by injection molding, the worm wheel 22 is directly formed around the outer circumferential surface of the center section in the axial direction of the screw nut 21a, 21b (portion that corresponds to the connecting section that connects the base end sections of the screw nuts 21a, 21b). Therefore, the worm wheel 22 rotates together with the screw nuts 21a, 21b. By making the worm wheel 22 using synthetic resin in this way, it is possible to reduce the weight of the suspension, however, alternatively, it is also possible to form the worm wheel 22 separately, and connect and fasten the worm wheel 22 directly to the screw nuts 21a, 21b, or indirectly by way of another member. In this case, the freedom of selecting the material for the worm wheel 22 is improved.

The worm 23 is made of metal or synthetic resin, and is constructed by a worm shaft 26 that is located in a twisted position with respect to the screw shafts 20a, 20b, and worm teeth 27 that are formed on the outer circumferential surface of the middle section of the worm shaft 26. The worm teeth 27 of the worm 23 engage with the worm wheel 22. In this example, by regulating the twist angle of the worm teeth 27 (set to be large), rotation of the worm wheel is not transmitted to the worm 23. As a result, the overall length of the upper arm 4b does not change when force is applied from the wheel to a pair of link arms 29a, 29b of the link mechanism 15. Alternatively, by providing the electric motor itself with a brake function, it is possible to obtain the same effect.

The electric motor 24 is supported by and fastened to the casing by a plurality of screws 28 (three screws in the example in the figures). By switching the power supply state, the electric motor 24 drives the drive shaft (not illustrated in the figure) in the forward or reverse direction. Moreover, the speed reducer 25 is constructed by a plurality of gears (not illustrated in the figure) that increase the power (torque) of the electric motor 24, and this speed reducer 25 transmits that power to the worm shaft 26 of the worm 23. In this example, by providing a speed reducer 25, it is possible to use an electric motor 24 that is more compact, and thus it is also possible to make the overall suspension for a vehicle compact and lightweight.

The link mechanism 15 is constructed by a pair of link arms 29a, 29b and a connecting member 30. The pair of link arms 29a, 29b are casted parts made using an iron-based alloy, aluminum alloy, magnesium alloy or the like, and are formed into rod shapes that are slightly bent into arc shapes. The connecting member 30 is composed of a socket of the upper joint 6, and a cover 31 that covers the upper portion of the ball housing section is provided in the center section thereof. In this example, the base end sections of the link arms are connected to the tip end sections of the screw shafts 20a, 20b using a joint member 32a so as to be able to rotate around a shaft in the up-down direction of the vehicle (front-back direction in FIG. 2A, 2B), and the tip end sections of the link arms 29a, 29b are connected to the corner sections of the connecting member 30 using a joint member 32b so as to be able to rotate around the shaft in the up-down direction of the vehicle 11.

In this example, an encoder and load sensor (not illustrated in the figures) that are placed inside a bearing unit 2 that is conventionally known such as that disclosed in JP 2005-98771 (A) are used to measure the lateral force on the tire (axial load) that is applied to the wheel 1. The data of the measured lateral force on the tire is sent to a controller (not illustrated in the figures), and by this controller using a comparison and judgment method, the controller determines whether the lateral force on the tire is excessive or insufficient for the current traveling condition of the vehicle. Then, based on that result, it performs control to supply electric power to the electric motor 24 (direction and amount).

More specifically, the electric motor 24 rotates and drives the worm 23 a specified number of revolutions (rotation angle) in the forward direction or reverse direction. As a result, the screw nuts 21a, 21b are rotated by way of the worm wheel 22, and the screw shafts 20a, 20b move apart a specified amount in different directions from each other in the axial direction (forward-backward direction of the vehicle, front-back direction in FIG. 1, up-down direction in FIG. 2). Then the opening angle of the link arms 29a, 29b is changed, which changes the length L of the link arms 29a, 29b in the width direction of the vehicle (left-right direction in FIG. 1 and FIG. 2) by a specified amount (changes the overall length of the upper arm 4b). More specifically, when the electric motor 24 is driven so that the amount that the screw shafts 20a, 20b protrude from the casing 12 is small as illustrated in FIG. 2A, the opening angle of the link arms 29a, 29b becomes small. By doing so, the length of the link arms 29a, 29b in the width direction of the vehicle 11 becomes large ($L=L_{max}$), and the overall length of the upper arm 4b becomes long. As a result, the distance from the center of pivoting O of the upper arm 4b to the center P of the upper ball joint 6 becomes large, and the camber angle γ changes. In other words, in the case of a positive camber, the camber angle becomes even larger, and in the case of a negative camber, the camber angle becomes smaller. On the other hand, when the electric motor 24 is driven so that the amount that the screw shafts 20a, 20b protrude from the casing 12 becomes large as illustrated in FIG. 2B, the opening angle of the link arms 28a, 28b becomes large. By doing so, the length of the link arms 29a, 29b in the width direction of the vehicle 11 becomes small ($L=L_{min}$), and the overall length of the upper arm 4b becomes short. As a result, the distance from the center of pivoting O of the upper arm 4b to the center P of the upper ball joint 6 becomes small, and the camber angle γ changes. In other words, in the case of a positive camber, the camber angle becomes smaller, and in the case of a negative camber, the camber angle becomes even larger.

The suspension for a vehicle of this example, by operating in this way, makes it possible to suitably change the camber angle γ according to the traveling conditions of the vehicle, and thus it is possible to adjust the size of the lateral force on the tire that occurs. In order to make the explanation more clear, FIG. 2B exaggeratedly illustrates the amount that the screw shafts 20a, 20b protrude more than in the actual case. In the actual case, it is not necessary for the protruding amount to be as much as illustrated in FIG. 2B. Moreover, the movable portion of each screw shaft is covered by a cover or bellows (not illustrated in the figures) in order to prevent foreign matter such as dirty water and the like from adhering the screw shafts.

As described above, in the case of the suspension for a vehicle of this example, construction for making it possible to change the overall length of the upper arm 4b is consolidated in the upper arm 4b itself, and does not require the installation of a member such as a hydraulic pump or the like on the vehicle side. Furthermore, the upper arm 4b is such that by using simple construction of just combining a pair of feed screw mechanisms 13a, 13b, a worm reduction gear 14 and a link mechanism 15, it becomes possible to change the overall length of the upper arm 4b. In the present invention, with this kind of construction, a suspension for a vehicle that is able to suitably change the camber angle γ according to the traveling conditions of the vehicle is achieved with simple construction, and it is possible to make that suspension more compact and lightweight. With this kind of construction, not only is it possible to improve the turning performance and the performance with traveling straight of the vehicle, but it is also possible to sufficiently suppress an increase in the unsprung weight, and to improve the traveling performance of the vehicle centered on traveling comfort and traveling stability.

Moreover, in this example, control of the camber angle γ (control of the overall length of the upper arm 4b) is performed electrically, so when compared to being controlled hydraulically, there is excellent controllability and response, and there is little power loss of the engine. Furthermore, electric power (energy) is consumed only when being driven, so it is also possible to save energy.

In addition, the overall length of the upper arm 4b is made to be able to change and not the lower arm 5, so even when the vehicle is stopped, it is possible to easily change the camber angle γ. Furthermore, by applying the suspension for a vehicle of the present invention to both the left and right wheels, it is possible to independently control the camber angle of the left and right wheels.

EXPLANATION OF THE REFERENCE NUMBERS

1 Wheel
2 Bearing unit
3 Knuckle
4, 4a, 4b Upper arm
5, 5a Lower arm
6 Upper ball joint
7 Lower ball joint
8 Shock absorber
9 Hydraulic cylinder
10 Hydraulic cylinder
11 Vehicle
12 Casing
13a, 13b Feed screw mechanism
14 Worm reduction gear
15 Link mechanism
16 Installation section
17 Bolt
18 Nut
19 Bushing
20a, 20b Screw shaft
21a, 21b Screw nut
22 Worm wheel
23 Worm
24 Electric motor
25 Speed reducer
26 Worm shaft
27 Worm teeth
28 Screw
29a, 29b Link arm
30 Connecting member
31 Housing section
32a, 32b Joint member

What is claimed is:

1. A suspension for a vehicle comprising:
    an upper arm that has a tip end section that is connected by way of an upper joint to an upper portion of a knuckle by which a wheel is supported so as to be able to rotate, and a base end section that is supported by the vehicle so as to be able to pivot in an up-down direction; and
    a lower arm that has a tip end section that is connected by way of a lower joint to a lower portion of the knuckle, and a base end section that is supported by the vehicle so as to be able to pivot in the up-down direction; wherein
    the upper arm comprises:
        a casing that is supported by the vehicle so as to be able to pivot in the up-down direction;
        a pair of screw shafts that are located on a same axis extending in a forward-backward direction of the vehicle, and are supported by the casing so as to be able to move only in an axial direction of the pair of screw shafts;
        a pair of screw nuts that engage around the pair of screw shafts, and are supported by the casing so as only to be able to rotate;
        a worm wheel that is combined with the pair of screw nuts so as to be able to rotate in synchronization with the pair of screw nuts;
        a worm that comprises worm teeth that engage with the worm wheel;
        an electric motor that is supported by the casing, and is able to rotate and drive the worm in both directions; and
        a pair of link arms that respectively have a tip end section which constitutes the tip end section of the upper arm and a base end section which constitutes the base end section of the upper arm, where the base end sections of the pair of link arms respectively connect to the tip end sections of the pair of screw shafts so as to be able to rotate around an axis extending in the up-down direction of the vehicle, and the tip end sections respectively connect to the upper joint of the knuckle so as to be able to rotate around an axis extending in the up-down direction of the vehicle, and wherein
    by the electric motor rotating and driving the worm so as to cause the pair of screw shafts to move out in opposite directions from each other in the axial direction of the pair of screw shafts, an opening angle of the pair of link arms changes, and thus a length of the pair of link arms in a width direction of the vehicle changes.

2. The suspension for a vehicle according to claim 1, wherein a combination of the pair of screw shafts and the pair of screw nuts is constructed by a sliding screw type feed screw mechanism where a female screw thread that is formed around an inner circumferential surface each of the screw nuts engage with a male screw thread that is formed around an outer circumferential surface each of the screw shafts such that they can slide against one another.

3. The suspension for a vehicle according to claim 1, wherein a combination of the pair of screw shafts and the pair of screw nuts is constructed by a ball screw type feed screw mechanism where an outer-diameter side ball screw groove that is formed around an inner circumferential surface of each of the screw nuts engage with an inner-diameter side ball screw groove that is formed around an outer circumferential surface of each of the screw shafts by way of a plurality of balls that are placed between the outer-diameter side ball screw groove and the inner-diameter side ball screw groove.

4. The suspension for a vehicle according to claim 1, wherein a rotation stopping mechanism for preventing relative rotation of the screw shafts with respect to the casing while allowing axial displacement of the screw shafts is provided between the pair of screw shafts and the casing.

5. The suspension for a vehicle according to claim 1, wherein the worm wheel is made of synthetic resin.

6. The suspension for an automobile according to claim 1, wherein a speed reducer that increases a power of the electric motor and transmits that power to the worm is provided between the worm and the electric motor.

7. The suspension for a vehicle according to claim 1, wherein the length of the pair of link arms in the width direction of the vehicle becomes large, when an amount that the pair of screw shafts from the casing becomes small and the opening angle of the pair of link arms becomes small, while the length of the pair of link arms in the width direction of the vehicle becomes small, when the amount that the pair of screw shafts from the casing becomes large and the opening angle of the pair of link arms becomes large.

\* \* \* \* \*